(12) United States Patent
Kayan et al.

(10) Patent No.: US 11,824,983 B2
(45) Date of Patent: *Nov. 21, 2023

(54) SECURING CRYPTOGRAPHIC DATA ONTO A PHYSICAL MEDIUM

(71) Applicant: COINPLUS, INC., West Hollywood, CA (US)

(72) Inventors: Yves-Laurent Kayan, Luxembourg (LU); Benoit Bertholon, Luxembourg (LU); Christian Bodt, Esch-sur-Alzette (LU)

(73) Assignee: COINPLUS, INC., West Hollywood, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/958,460

(22) Filed: Oct. 3, 2022

(65) Prior Publication Data

US 2023/0027241 A1 Jan. 26, 2023

Related U.S. Application Data

(63) Continuation of application No. 16/759,500, filed as application No. PCT/EP2018/079334 on Oct. 25, 2018, now Pat. No. 11,463,252.

(30) Foreign Application Priority Data

Oct. 27, 2017 (LU) ........................................ 100497

(51) Int. Cl.
*H04L 9/08* (2006.01)
*G06Q 20/36* (2012.01)
(Continued)

(52) U.S. Cl.
CPC ....... *H04L 9/0897* (2013.01); *G06Q 20/3674* (2013.01); *G06Q 20/3678* (2013.01);
(Continued)

(58) Field of Classification Search
CPC .......... H04L 9/085; H04L 9/0894; H04L 9/10
See application file for complete search history.

(56) References Cited

U.S. PATENT DOCUMENTS 10,068,228 B1   9/2018  Winklevoss et al.
11,463,252 B2 * 10/2022  Kayan ................... H04L 9/0897
(Continued)

OTHER PUBLICATIONS

International Search Report issued in connection with PCT Application No. PCT/EP2018/079334 dated Jan. 1, 2019.
(Continued)

*Primary Examiner* — David J Pearson
(74) *Attorney, Agent, or Firm* — ARLUYS IP, P.C.

(57) ABSTRACT

The present invention relates to a method and a system for inscribing and securely storing cryptographic keys on a physical medium, and to a corresponding physical medium, comprising the following steps:
from a first management entity (31), generating (1) a first pair of asymmetric cryptographic keys comprising a first user public key (pub1) and a first user private key (priv1), inscribing (2) the first user private key (priv1) onto a physical medium, and affixing (4) a first tamper-evident concealing element (hol1) to the physical medium in order to conceal the first user private key (priv1) and seal same, said first user private key (priv1) being accessible only by visibly breaking said first tamper-evident concealing element (hol1);
from the second management entity (32), generating (6) a second pair of asymmetric cryptographic keys comprising a second user public key (pub2) and a second user private key (priv2),
inscribing (7) the second user private key (priv2) onto the physical medium and affixing (9) a second tamper-evident concealing element (hol2) to the physical medium in order to conceal the second user private key
(Continued)

(priv2) and seal same, said second user private key (priv2) being accessible only by visibly breaking said second tamper-evident concealing element (hol2);

generating (10) at least one last user public key (pub0) and/or at least one cryptographic address (adr, adr-mult) from the first user public key (pub1) and the second user public key (pub2), inscribing (11) said at least one last public user key (pub0) and/or said at least one cryptographic address (adr, adr-mult) onto the physical medium, and verifying (12, 13) same, and finally recovering the private keys (priv1, priv2) comprising the generation of a last user private key (priv0) corresponding to the last user public key (pub0) and/or to said at least one cryptographic address (adr, adr-mult).

17 Claims, 8 Drawing Sheets

(51) Int. Cl.
*G06Q 30/018* (2023.01)
*H04L 9/32* (2006.01)
*H04L 9/10* (2006.01)
*H04L 9/00* (2022.01)

(52) U.S. Cl.
CPC ......... *G06Q 30/0185* (2013.01); *H04L 9/085* (2013.01); *H04L 9/0894* (2013.01); *H04L 9/10* (2013.01); *H04L 9/3255* (2013.01); *G06Q 2220/00* (2013.01); *H04L 9/50* (2022.05); *H04L 2209/56* (2013.01)

(56) References Cited

U.S. PATENT DOCUMENTS

| | | |
|---|---|---|
| 2003/0161475 A1 | 8/2003 | Crumly et al. |
| 2005/0102512 A1 | 5/2005 | Goh et al. |
| 2013/0166455 A1 | 6/2013 | Feigelson |
| 2015/0127946 A1 | 5/2015 | Miller et al. |
| 2017/0048209 A1 | 2/2017 | Lohe et al. |

OTHER PUBLICATIONS

Pedro Franco, "Understanding Bitcoin: Cryptography, Engineering and Economics", Nov. 24, 2024.

* cited by examiner

SECURING CRYPTOGRAPHIC DATA ONTO A PHYSICAL MEDIUM

CROSS-REFERENCE TO RELATED APPLICATIONS

This application claims the benefit under 35 U.S.C. § 120 as a continuation of application Ser. No. 16/759,500, filed Apr. 27, 2020, which claims the benefit under 35 U.S.C. § 119(b) and 35 U.S.C. § 371 as a U.S. national stage application based upon PCT international application PCT/EP2018/079334, filed Oct. 25, 2018, which claims the benefit under 35 U.S.C. § 119(b) of Luxembourgish application 100497, filed Oct. 27, 2017, the entire contents each of which are hereby incorporated by reference for all purposes as if fully set forth herein. The applicant(s) hereby rescind any disclaimer of claim scope in the parent application(s) or the prosecution history thereof and advise the USPTO that the claims in this application may be broader than any claim in the parent application(s).

TECHNICAL FIELD

The present invention relates to data security, and more particularly to the secure handling of highly sensitive data elements such as cryptographic keys. The invention provides a method for inscription and storage with secure access control. The present invention further relates to a method and a system for securely inscribing and securely storing cryptographic keys on a physical medium, and a physical medium produced according to this method. The product of this invention is a physical medium that the user can store securely, using the access controls they deem to be appropriate and necessary.

The invention is particularly suitable for, but not limited to, the use of digital wallets (software). This may include, for example, wallets used in connection with cryptocurrencies such as Bitcoin, Ethereum, Litecoin, etc. According to a first aspect, the present invention relates to a method for inscribing and storing cryptographic keys on a physical medium including cryptographic keys used for example to allow access to wallets in relation to cryptocurrencies. According to a second aspect, the invention proposes a system for inscribing and storing such cryptographic keys on a physical medium. According to a third aspect, the invention proposes a physical medium produced according to this method and capable of storing such cryptographic keys and of allowing the reconstruction of an asymmetric key for specific access to a secure account in association with a digital wallet management system.

Indication of the prior art Concerning the prior art, there are methods and systems for generating cryptographic keys to allow the reconstruction of a specific access key to a secure account.

Publication WO-2017145018 discloses an example of a secure system and method for exchanging entities via a blockchain by integrating tokenization techniques, as well as techniques for integrating metadata in an exchange script of a blockchain transaction, the script comprising a first user public key (P1A) associated with a first user private key (V1A) forming an asymmetric cryptographic pair, and a first third-party public key (PIT) associated with a first third-party private key (V1T) forming a asymmetric cryptographic pair. This method consists of a hash of the first script to generate a first hash script and to publish the first script and the first hash script on a distributed hash table.

Publication U.S. 2017237561 discloses another example of a method and system for supporting secure communications using a module communicating with a server by accessing the Internet, and an application, the module being able to derive private/public key pairs using cryptographic algorithms and parameter sets to send data from the module to the application and receive module instructions from the application.

Publication US2015164192 discloses a collectable object or medium with a sealed cavity that contains a private key which grants the user access to a cryptocurrency registered to an account when the cavity of the sealed object is visibly broken in order to access the cavity, the object comprising a recording of the date of deposit, and the amount of the cryptocurrency in the account, instructions for the use of a private and/or public key, and a public key that allows the user to see the amount of cryptocurrency deposited in the account.

Publication U.S. 2013/0166455A1 discloses another example of a method and system for inscription and secure storage in which the private keys are divided in order to be stored in different places. A major problem with the system of this publication is that the manufacturer 206 (FIG. 2) knows the secret that allows the cryptocurrency to be used.

Publication WO 2017/028828 A1 discloses a method for inscribing and securely storing cryptographic keys on a physical medium device according to the preamble of claim 1, and a system for inscribing and securely storing cryptographic keys on a physical medium according to the preamble of claim 14.

Definitions

Asymmetric cryptography: Asymmetric cryptography is based on the existence of one-way mathematical functions. These mathematical functions use two parameters called a private key and public key. The public key is used to encrypt or verify a signature, and is intended to be disseminated and used by everyone. The corresponding private key is used to decrypt or sign a message.

Asymmetric key pair: An asymmetric key pair is made up of a public key and the corresponding private key. A key pair is either used for encryption/decryption or for signing/verification. Knowing the public key, it is impossible, within a reasonable time, to find the corresponding private key. The private key is confidential and must be kept secret.

Electronic signature: An electronic signature uses asymmetric cryptography. The private key is used to sign and the public key is used to verify the signature.

Tamper-evident holographic sticker: A tamper-evident holographic sticker is a sticker containing a 3D hologram which, when removed, is destroyed. Once a tamper-evident holographic sticker has been removed, it is impossible to reposition it without its removal being visually detected. It can therefore be used to see if a secret hidden under this sticker has been revealed.

Cryptocurrency: Cryptocurrencies are currencies based on the so-called "blockchain" technology, in which all the transactions are stored in a database that is distributed among all the participants. Each cryptocurrency transaction must be signed electronically using an asymmetric private key.

Cryptocurrency token: Unit of value used in cryptocurrencies. These tokens are associated with a public key and can be transferred from one public key to another by signing (using the private key) an electronic transaction.

Cryptocurrency address: In the context of cryptocurrencies, tokens can be associated not with a public key but with an address. This address is most often calculated based on the public key.

S-of-n multi-signature address: Tokens used as cryptocurrency can be sent to a multi-signature address, which means that in order to be used the tokens must be spent in a transaction which must be signed by multiple asymmetric private keys. In addition, it is possible to indicate the number of signatures s required among the n selected key pairs. For example, to spend a token sent to a 3-of-4 multi-signature address, the signature of 3 private keys from a set of 4 pairs of asymmetric keys may be required. All information (set of asymmetric keys, number of signatures required, etc.) regarding the requirements for using tokens sent to a multi-signature cryptocurrency address is "summarized" at the address (https://dithub.com/bitcoin/bips/blob/master/bip-0016.mediawiki).

Root certificate: Root certificates are electronic certificates generated by a certification authority. These root certificates are found, for example, in web browsers and make it possible to verify the validity of a website's certificate and therefore to start an encrypted communication.

Digital wallet: A digital wallet is a software application or a service that allows its user to carry out payment transactions using cryptocurrencies. The role of the digital wallet is to create, sign and publish a cryptocurrency transaction.

Problem: Secure Long-Term Storage of Cryptographic Private Keys

Public-key cryptography is often used to protect information necessary for transactions. The use of asymmetric keys, including public-key cryptography, shifts the question of security to some extent. Although the private key is kept secret, its corresponding public key can be made public. Its interception by a third party is not problematic.

Like all other computer data, cryptographic private keys are subject to the problem of storage, which requires a high level of security. It must be able to withstand attacks by malicious people, the ravages of time and natural disasters.

Withstanding attacks by malicious people means that the medium should not be easily accessible. This can be done by storing the key on an off-line medium in a place with strict access controls, for example in a bank vault. This means that the cryptographic key is not used regularly, which is the case for the private keys of the root certificates or the keys used for long-term cryptocurrency investments.

According to the prior art, these methods and systems for generating known cryptographic keys on a medium can be criticized for not being intended to solve the problem of long-term inscription and storage of private keys with a high level of security and because these cryptographic keys are vulnerable to interception by unauthorized third parties. With these known cryptographic key generation methods and systems, nothing is provided to withstand attacks by malicious people during the creation of the medium, or to prevent the medium from being destroyed by the ravages of time and natural disasters.

In addition, problems also appear in their implementation because these storage media for cryptographic keys are unreliable and do not withstand bad weather or other natural disasters.

Private key storage raises significant security concerns. Digital media are fragile and can degrade over time. As an example, in the case of a digital cryptocurrency wallet such as a Bitcoin wallet, the wallet includes software that allows a user to log in. The private key is stored either by the wallet installed on the user's peripheral, or by a wallet service provider. However, the stored private key may be stolen or lost, the loss possibly being due to damage caused to the user's equipment, for example a computer. Likewise, if the user dies or becomes incapacitated, access to the private key may be lost and therefore the funds associated with the wallet become inaccessible. While storage of the private key on the service provider's side can overcome these issues, the user must be prepared to trust the service provider to keep their private key safe.

Security breaches on the service provider's side are a real and significant risk.

SUMMARY OF THE INVENTION

It is therefore clear that there is a need for a method and a system which, to a large extent, makes it possible to remedy the shortcomings which have been encountered in the prior art.

One of the aims of the invention is to provide a method and a system for securely inscribing cryptographic keys onto a physical medium, with which private cryptographic keys are no longer subject to the problem of long-term storage.

Another aim of the present invention is to provide a method and a system which, in the case of the cryptographic keys, provides storage with a high level of security, and which can withstand attacks by malicious persons, as well as the ravages of time and natural disasters.

Withstanding attacks by malicious people means that the medium should not be easily accessible.

One aim of the present invention is therefore to provide a method and a system for inscribing and discreetly storing cryptographic keys on a reliable physical medium.

The present invention is intended to improve confidence in the creation of cryptographic keys on a physical medium in order to facilitate user access to the cryptographic keys stored on the medium and to allow the reconstruction of a specific access key, e.g. for accessing a secure account in combination with a wallet management system. Thus, it is desirable to provide a solution which allows safe handling of a secret. This secret can be a cryptographic key and/or an address calculated from a cryptographic key to give access to the key.

Such an improved solution has been devised.

The problem to be solved is that of overcoming the above-mentioned drawbacks of the prior art, i.e. to provide a storage medium for cryptographic keys that is entirely reliable and resistant to natural disasters, as well as a method for inscribing onto said medium that reduces the trust required for the entities involved in its creation.

Such an improved solution has been devised. According to the present invention, this aim is achieved in that the method for inscribing and securely storing cryptographic keys on a physical medium comprises the features of claim 1.

To this end, according to another aspect, the invention provides a system for inscribing and securely storing cryptographic keys on a physical medium which comprises the features of claim 14.

According to another aspect, the invention further provides a medium for inscribing and securely storing cryptographic keys which comprises the features of claim 17.

More particularly, for this purpose, in accordance with the invention, this aim is achieved by the fact that the inscription and storage method of the aforementioned type comprises the following steps:

a) from a first management entity, generating a first pair of asymmetric cryptographic keys comprising a first user public key (pub1) and a first user private key (priv1), comprising:

storing the first user public key (pub1) in a first recording memory;

inscribing the first user private key (priv1) onto a physical medium, and verifying the first user private key (priv1) inscribed and affixing a first tamper-evident concealing element (hol1) to the physical medium in order to conceal the first user private key (priv1) and seal same, said first user private key (priv1) being accessible only by visibly breaking said first tamper-evident concealing element (hol1);

b) sending the physical medium to a second management entity, c) from the second management entity, generating a second pair of asymmetric cryptographic keys comprising a second user public key (pub2) and a second user private key (priv2), comprising:

storing the second user public key (pub2) in a second recording memory;

inscribing the second user private key (priv2) onto the physical medium, and verifying the second user private key (priv2) inscribed and affixing a second tamper-evident concealing element (hol2) to the physical medium in order to conceal the second user private key (priv2) and seal same, said second user private key (priv2) being accessible only by visibly breaking said second tamper-evident concealing element (hol2);

d) generating at least one last user public key (pub0) and/or at least one cryptographic address (adr, adr-mult) from the first user public key (pub1) and the second user public key (pub2), e) inscribing said at least one last public user key (pub0) and/or said at least one cryptographic address (adr, adr-mult) onto the physical medium, and verifying same, and f) finally recovering the private keys (priv1, priv2) comprising the generation of a last user private key (priv0) corresponding to the last user public key (pub0) and/or to said at least one cryptographic address (adr, adr-mult).

According to the invention, the method and the system allow the transaction to be carried out only with the single physical medium. The solution of the invention is therefore to completely delete the secrets owned by the separate entities which are involved and to keep them only on the single medium.

Thus, thanks to the method and the system of the invention allowing the creation of a physical medium with greater confidence than the private key, it will only be usable by the holder of the physical medium, the idea being that, separately, the entities involved in its creation never have access to the complete private key. None of the entities can use the complete cryptographic key. Only the owner of the physical medium can use the complete cryptographic key.

In one embodiment of the invention, the first user private key (priv1) is engraved on the physical medium by a first engraving apparatus and the second user private key (priv2) is engraved on the physical medium by a second engraving device distinct from the first engraving apparatus.

Preferably, said at least one last user public key (pub0) is engraved on the physical medium and/or said at least one cryptographic address (adr, adr-mult) is engraved on the physical medium.

Preferably, the last user public key (pub0) is part of a third asymmetric cryptographic pair comprising the last user public key (pub0) and the last user private key (priv0).

Preferably, in one embodiment of the invention, the step of recovering the private keys comprises:

verifying the integrity of the first and second tamper-evident concealing elements (hol1, hol2), reading the first and second user private keys (priv1, priv2) by removing the first and second tamper-evident concealing elements (hol1, hol2), and then, from the first and second user private keys (priv1, priv2) inscribed onto the medium, generating the last user private key (priv0) corresponding to the last user public key (pub0).

Preferably, in one embodiment of the invention, the last user public key (pub0) makes it possible to generate said at least one cryptographic address (adr), this address (adr) being calculated from the last user public key (pub0) and being inscribed onto the physical medium.

In another embodiment of the invention, said at least one cryptographic address (adr-mult) is a multi-signature address (adr-mult) generated from the first user public key (pub1) and from the second user public key (pub2), this multi-signature address (adr-mult) being engraved on the physical medium.

Preferably, said method includes a step of recovering private keys which comprises:

verifying the integrity of the first and second tamper-evident concealing elements (hol1, hol2), reading the first and second user private keys (priv1, priv2) by removing the first and second tamper-evident concealing elements (hol1, hol2), and from the first and second user private keys (priv1, priv2) inscribed onto the medium, recalculating said at least one cryptographic address (adr) and then verifying whether it matches the cryptographic address (adr) inscribed onto the physical medium to make it possible to access and/or withdraw cryptocurrency from an account.

In another embodiment of the invention, the method comprises:

f) sending the physical medium to a third management entity, g) from the third management entity, generating a third pair of asymmetric cryptographic keys comprising a third user public key (pub3) and a third user private key (priv3), comprising:

storing the third user public key (pub3) in a third recording memory;

inscribing the third user private key (priv3) onto a physical medium, and verifying the third user private key (priv3) inscribed and affixing a third tamper-evident concealing element (hol3) to the physical medium in order to conceal the third user private key (priv3) and seal same, said third user private key (priv3) being accessible only by visibly breaking said third tamper-evident concealing element (hol3);

h) generating at least one last user public key (pub0) and/or at least one cryptographic address (adr, adr-mult) from the first user public key (pub1), the second user public key (pub2), and the third user public key (pub3), and i) inscribing said last public user key (pub0) and/or said at least one cryptographic address (adr, adr-mult) onto the physical medium, and verifying same.

Preferably, the step of recovering private keys comprises:
verifying the integrity of the first, second and third tamper-evident concealing elements (hol1, hol2, hol3),
reading the first, second and third user private keys (priv1, priv2, priv3) by removing the first, second and third concealing elements, and
then, from the first, second and third user private keys (priv1, priv2, priv3) inscribed onto the medium, generating the last user private key (priv0) corresponding to the last user public key (pub0) and/or to said at least one cryptographic address (adr, adr-mult).

Preferably, the last user public key (pub0) makes it possible to generate said at least one cryptographic address (adr), this address (adr) being calculated from the last user public key (pub0) and being engraved on the physical medium.

Preferably, each of the concealing elements is a tamper-evident holographic sticker (hol1, hol2, hol3).

In another embodiment of the invention, the method comprises generating a plurality of n asymmetric cryptographic keys, from n distinct management entities, wherein n>2, said keys each comprising a combination of a user public key with a user private key, and/or a public key address, and/or a multi-signature address of multiple public keys, the n−1 first management entities performing steps (1) to (5) one after the other and the $n^{th}$ management entity performing steps (6) to (13).

According to another aspect, the system for inscribing and securely storing cryptographic keys on a physical medium of the invention comprises:
a first management entity configured to generate a first pair of asymmetric cryptographic keys comprising a first user public key (pub1) and a first user private key (priv1), the first management entity comprising:
 a first computer in which program instructions are stored, which instructions, when read by a first data processor, cause the first computer to generate the first user private key (priv1) and store the first user public key (pub1) in a first recording memory,
 a first device associated with the first computer configured to inscribe the first user private key (priv1) onto a physical medium, and
 a first means for verifying the first user private key (priv1) inscribed and affixing a first tamper-evident concealing element (hol1) to the physical medium in order to conceal the first user private key (priv1) and make it non-visible,
a second management entity configured to generate a second pair of asymmetric cryptographic keys comprising a second user public key (pub2) and a second user private key (priv2), the second management entity (32) comprising:
 a second computer in which program instructions are stored, which instructions, when read by a second data processor, cause the second computer to be configured to store the second user public key (pub2) in a second recording memory;
 a second device associated with the second computer for inscribing the second user private key (priv2) onto the physical medium, and
 a second means for verifying the second user private key (priv2) inscribed and affixing a second tamper-evident concealing element (hol2) to the physical medium in order to conceal the second user private key (priv2) and make it non-visible,
 the second computer being further configured to generate a last user public key (pub0) from the first user public key (pub1) and the second user public key (pub2), and to allow the inscription of the last user public key (pub0) onto the physical medium by the second device.

Preferably, the first device comprises a first engraving apparatus configured to engrave the first user private key (priv1) on the physical medium, and said second device comprises a second engraving apparatus distinct from the first engraving apparatus configured to engrave the second user private key (priv2) on the physical medium.

In another embodiment of the invention, the system further comprising:
a third management entity configured to generate a third pair of asymmetric cryptographic keys comprising a third user public key (pub3) and a third user private key (priv3), the third management entity comprising:
 a third computer in which program instructions are stored, which instructions, when read by a third data processor, cause the third computer to store the third user public key (pub3) in a third recording memory and to generate the third first user private key (priv3),
 a third device associated with the third computer configured to inscribe the third user private key (priv3) onto the physical medium, and
 a third means for verifying the third user private key (priv3) inscribed and affixing a third tamper-evident concealing element (hol3) to the physical medium in order to conceal the third user private key (priv3) and make it non-visible,
 the third computer being further configured to generate the last user public key (pub0) from the first user public key (pub1), the second user public key (pub2) and the third user public key (pub3), and to allow the inscription of the last user public key (pub0) onto the physical medium by the third device.

According to another aspect, the physical medium for inscribing and securely storing cryptographic keys of the invention comprises
a first user private key (priv1) inscribed onto the medium, the first user private key (priv1) being associated with a first user public key (pub1) to form a first pair of asymmetric cryptographic keys,
a first tamper-evident concealing element (hol1) for concealing first user private key (priv1) and sealing same, said first user private key (priv1) being accessible only by visibly breaking said first tamper-evident concealing element (hol1);
a second user private key (priv2) inscribed onto the medium, the second user private key (priv2) being associated with a second user public key (pub2) to form a second pair of asymmetric cryptographic keys,
a second tamper-evident concealing element (hol2) for concealing second user private key (priv2) and sealing same, said second user private key (priv2) being accessible only by visibly breaking said second tamper-evident concealing element (hol2); and
at least one last user public key (pub0) and/or at least one cryptographic address (adr, adr-mult) inscribed onto the medium, which is generated from the first user public key (pub1) and the second user public key (pub2).

Preferably, the medium further comprises
a third user private key (priv3) inscribed onto the medium, the third user private key (priv3) being associated with a third user public key (pub3) to form a third pair of asymmetric cryptographic keys,
a third tamper-evident concealing element (hol3) for concealing third user private key (priv3) and sealing same, said third user private key (priv3) being accessible only by visibly breaking said third tamper-evident concealing element (hol3); and the last user public key (pub0) and/or the cryptographic address (adr, adr-mult) inscribed onto the medium being generated from the first user public key (pub1), the second user public key (pub2) and the third user public key (pub3).

Preferably, the physical medium is made of metal, wood, glass, stone, plastic, ceramic, leather, fabric or paper.

Preferably, the physical medium can be formed from a bar of metal or metal alloy, such as a gold, platinum, silver or steel bar.

In one embodiment of the invention, the physical medium is further formed of one or more moving metal parts, the various public keys, private keys or addresses being inscribed onto said moving metal parts.

In another embodiment of the invention, the medium is formed by a plurality of separate elements and a base, each separate element having its own private keys (priv1, priv2) and its own public key (pub1), a multi-signature cryptocurrency address common to the separate elements being generated and inscribed onto the base.

In another embodiment of the invention, the physical medium comprises a plurality of n asymmetric cryptographic keys, wherein n>2, said cryptographic keys each comprising a combination of a user public key with a user private key and/or with a public key address and/or with a multi-signature address of multiple public keys, the n private user keys being inscribed onto the medium, a plurality of n tamper-evident concealing elements for concealing each of the respective private user keys inscribed onto the medium and sealing same, said n private user keys being accessible only by visibly breaking said n respective tamper-evident concealing elements, and an n+1th user public key and/or an n+1th cryptographic address (adr, adr-mult) inscribed onto the medium, which is generated from the n user public keys.

Preferably, the physical medium also includes one or more of the following pieces of information:

the name of a management entity, a serial number, a production year, a name and an amount of cryptocurrency.

In the context of the present invention, the aims are achieved in that cryptographic keys can be stored on an off-line physical medium in a place with strict access controls, for example in a bank vault. This means that the cryptographic key is not used regularly, which is the case for the private keys of the root certificates or the keys used for long-term cryptocurrency investments.

Digital media are fragile and can degrade over time. However, cryptographic keys are small compared to other computer files, which makes it possible to store them on physical, and therefore non-digital, media.

Certain metals or alloys are very strong media that can withstand significant physical constraints. These media are therefore very good candidates for long-term storage of cryptographic keys.

According to the invention, the cryptographic keys can be engraved on a bar of metal or metal alloy, such as a gold, platinum, silver or steel bar.

Information storage on metals requires expertise and specialized machines. Private individuals must therefore delegate this process to a trusted party. Trust is therefore the critical point of this method because the entity that inscribes the confidential information onto the metal will have temporary access to the information. The developed process of the invention makes it possible to reduce the risk associated with trust in a single entity by dividing this trust between several separate, distinct entities.

Cryptography involves techniques for the secure storage of sensitive data as well as for the communication thereof between two or more separate, distinct management entities. A management entity may include a mobile communication device, a tablet, a laptop computer, a desktop computer, other forms of computing devices and communication devices, a server device in a network, a client device, etc. Management entities can be associated, for example, with an individual, with a group of people, such as the employees of a company, or with a system such as a banking system. For security reasons, two or more management entities cannot be linked by a communication network because it would not be secure and would be vulnerable to interception by unauthorized third parties. Therefore, several different secret pieces of information generated randomly, with sufficient entropy, are inscribed onto a single medium one after the other by two different people from separate, distinct management entities. Preferably, each of the two persons covers the secret with a security cover immediately after inscribing same, for example with a security hologram.

One or more embodiments of the invention comprise the step of deriving a cryptographic key from a pair of existing cryptographic keys.

According to a preferred embodiment, the invention consists of inscribing multiple private keys onto a medium formed by a metal bar and then hiding these private keys under a tamper-evident holographic sticker. Each key is engraved and hidden by a different player. As a result, the end owner of the bar no longer needs to trust a single entity. The owner can preferably keep the physical medium in a place with strict access controls, for example in a bank vault. For cryptocurrencies, the result will preferably be a metal bar inscribed with:

A private key engraved by Entity 1 and hidden by a tamper-evident holographic sticker.

A private key engraved by Entity 2 and hidden by a tamper-evident holographic sticker.

A serial number.

A production year.

The name and the amount of cryptocurrency.

The public address corresponding to the private key.

The invention provides a computer-implemented method. This can allow the control of secure access to a resource with a verification or authentication method by managing cryptographic keys. The process for inscribing cryptographic keys requires at least two different entities. Preferably, the entities are equipped with the same type of hardware and the same software. They have an engraving machine connected to a computer to carry out the inscription onto the medium, for example a metal bar. This computer is not connected to any network, in order to avoid cyberattacks. It is also advisable to have a computer with electromagnetic protection in order to avoid attacks using electromagnetic waves to damage or spy on the equipment. The software used for generating private keys is installed on this computer. Each management entity preferably has different holograms which it will affix to the metal bar.

The software makes it possible to carry out cryptographic calculations for generating, verifying and signing asymmetric key pairs. It also makes it possible to generate a cryptocurrency address from a key or from multiple public keys.

The invention provides an advantageous access control method and system.

According to the invention, it is only at the recovery or redemption stage that the last private key priv0 is generated or calculated. It has never previously been present on any computer or anywhere else, which means that neither the employees of the different management entities nor the employees of entity 2 could see this last private key priv0, and no computer has generated this last private key priv0 beforehand.

Preferably, the owner of the metal bar can verify that the user private keys or secrets inscribed onto the bar have not been revealed by verifying the integrity of the tamper-evident holographic stickers. Consequently, when the owner wishes to recover the last private key priv0 corresponding to the public key pub0 inscribed onto their bar, they must remove the two tamper-evident holographic stickers. The user private keys or secrets then become visible. The software for recovering private keys asks the owner of the bar to enter the secrets inscribed onto the metal. The software then generates the last private key priv0 corresponding to the public key pub0 and it is only at this recovery stage that the last private key priv0 is calculated.

BRIEF DESCRIPTION OF THE FIGURES

Other characteristics and advantages of the invention will become apparent on reading the detailed description which follows. Also, in order to allow a clearer understanding of the invention, several preferred embodiments will be described below, by way of example, with particular reference to the appended figures, among which.

FIRST EMBODIMENT OF THE INVENTION

Figure 1:
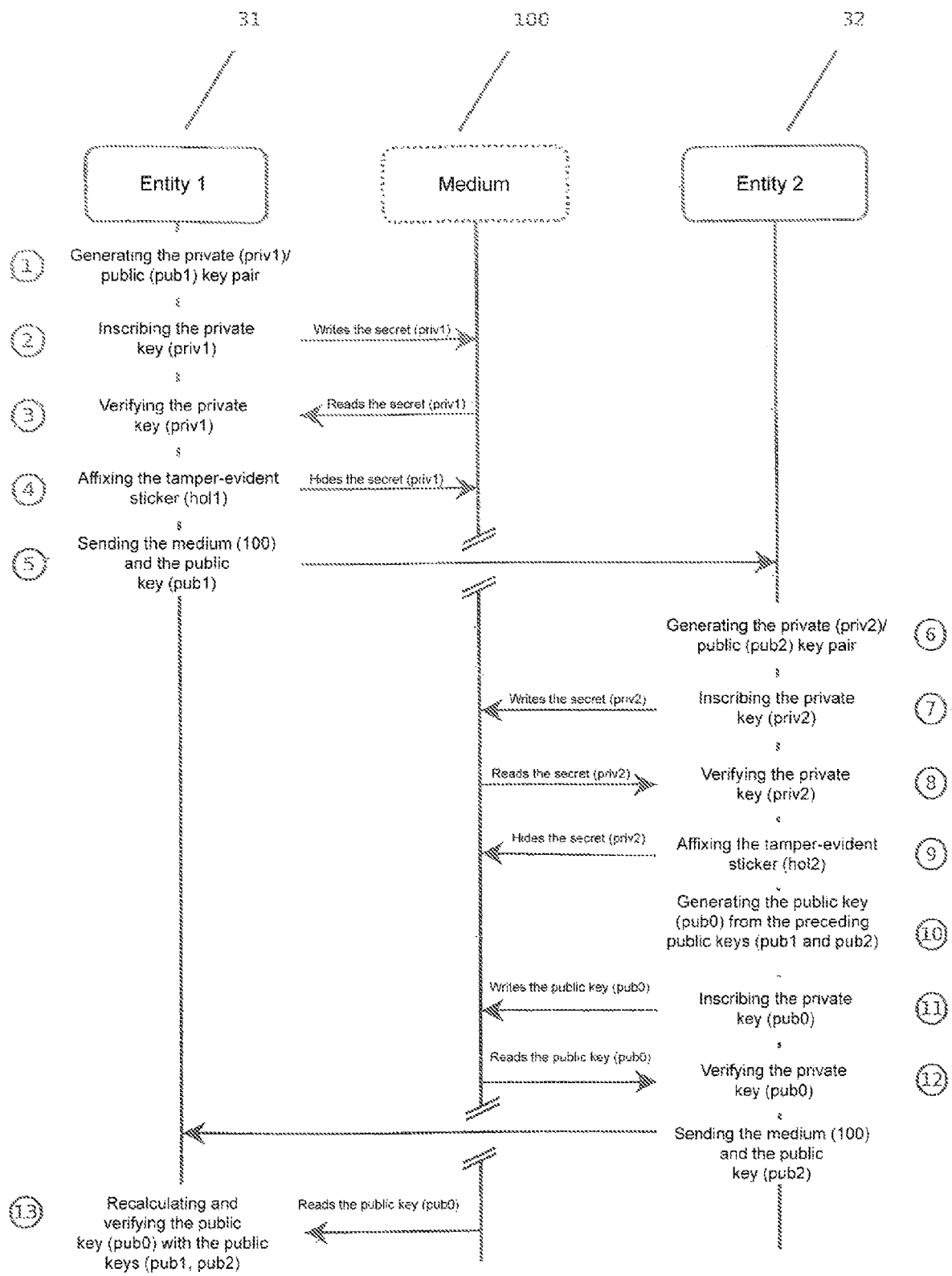
FIG. 1 shows a diagram of a representative embodiment of the invention using two management entities to provide a last user public key (pub0)

FIG. 1 shows a representative embodiment of the invention using two management entities 31 and 32 to provide a last user public key (pub0).

The system for inscribing and securely storing cryptographic keys on a physical medium includes:

a first management entity (31) configured to generate a first pair of asymmetric cryptographic keys comprising a first user public key (pub1) and a first user private key (priv1), the first management entity (31) comprising:

a first computer (41) in which program instructions are stored, which instructions, when read by a first data processor, cause the first computer to generate the first user private key (priv1) and store the first user public key (pub1) in a first recording memory, a first device (51) associated with the first computer configured to inscribe the first user private key (priv1) onto a physical medium, and a first means for verifying the first user private key (priv1) inscribed and affixing a first tamper-evident concealing element (hol1) to the physical medium in order to conceal the first user private key (priv1) and make it non-visible, a second management entity (32) configured to generate a second pair of asymmetric cryptographic keys comprising a second user public key (pub2) and a second user private key (priv2), the second management entity (32) comprising:

a second computer (42) in which program instructions are stored, which instructions, when read by a second data processor, cause the second computer (42) to be configured to store the second user public key (pub2) in a second recording memory;

a second device (52) associated with the second computer for inscribing the second user private key (priv2) onto the physical medium, and a second means for verifying the second user private key (priv2) inscribed and affixing a second tamper-evident concealing element (hol2) to the physical medium in order to conceal the second user private key (priv2) and make it non-visible, the second computer (42) being further configured to generate a last user public key (pub0) from the first user public key (pub1) and the second user public key (pub2), and to allow the inscription of the last user public key (pub0) onto the physical medium by the second device (52).

Hardware and Software

The process for inscribing cryptographic keys requires at least two different management entities 31 and 32.

The management entities 31 and 32 can be associated, for example, with an individual, with a group of people, such as the employees of a company, or with a system such as a service provider.

Figure 7:
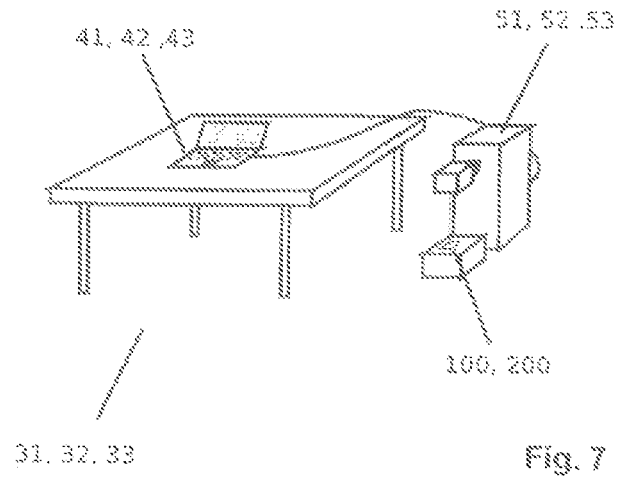
FIG. 7 is a schematic view of a management entity representative of the system of the invention.

As shown in FIG. 7, the entities 31 and 32 comprise an engraving machine 51, 52 connected to a computer 41, 42 for inscribing onto the metal bar. This computer 41, 42 is not connected to any network, in order to avoid cyberattacks. It is also advisable to have a computer 41, 42 with electromagnetic protection in order to avoid attacks using electromagnetic waves to damage or spy on the equipment. The software used for generating private keys is installed on this computer. The entities 31 and 32 can use the same type of hardware and software. Each entity has different holograms which it will affix to the metal bar.

The software makes it possible to carry out cryptographic calculations for generating, verifying and signing asymmetric key pairs. It also makes it possible to generate a cryptocurrency address from a key or from multiple public keys. It is possible to use a computer 41, 42 with electromagnetic protection in order to avoid attacks using electromagnetic waves to damage or spy on the equipment. The software used for generating private keys is installed on this computer 41, 42. Each entity has different holograms which it will affix to the metal bar.

If there are two entities, four employees may be involved, for example:

Alice and Albert, employees of the first entity 31.
Bob and Brian, employees of the second entity 32.

Inscribing the Cryptographic Keys

The steps of generating and inscribing the public and private keys are shown in the diagram of FIG. 1.

(1) Alice generates a public/private key pair on the computer 41 using the software.

(2) Alice takes a metal bar 100 and inscribes the private key (priv1).

(3) Albert enters this private key into the software. The latter re-generates the public key (pub1). Albert verifies that the public key generated from the private key and the public key (pub1) generated by Alice are the same.

(4) Once this verification has been carried out, Alice and Albert affix the tamper-evident holographic sticker (hol1) of their entity 31 over the private key (priv1).

(5) Alice and Albert send the metal bar and the public key (pub1) to the second entity. The second entity 32 then performs a similar process.

(6) Brian generates a public/private key pair, (7) Brian inscribes the private key (priv2), then (8) Bob verifies with the software that the engraved key has the same public key (pub2) as that of Brian.

(9) Bob and Brian affix the tamper-evident holographic sticker (hol2) of their entity 32 over the private key (priv2).

(10) Then, using the two public keys pub1 and pub2, Brian uses the software to derive a third public key (pub0).

(11) Brian inscribes this public key (pub0) onto the metal bar 100.

(12) In the last step Bob verifies, using the public keys pub1 and pub2, that the public key pub0 has been correctly engraved on the metal bar 100. For this, he enters, in turn, the public keys pub1 and pub2 into the software and makes sure that the public key engraved on the metal bar 100 is the correct one. Bob and Brian send the metal bar and the public key (pub2) to the first entity.

(13) Employees Alice and Albert of the entity 31 must also calculate the public key (pub0) using the public keys pub1 and pub2 and verify that the public key (pub0) inscribed onto the metal bar 100 is the same as the one they calculated.

Then, once the engraving process has been completed correctly, the employees of the entity 31 seal the metal bar 100 in plastic protection.

This process makes it possible to create a metal bar 100 on which two private keys (priv1 and priv2) are inscribed by two different entities, hidden by two tamper-evident holographic stickers (hol1 and hol2), as well as a public key (pub0) corresponding to the combination of the two hidden private keys (priv1 and priv2). At no time were the two private keys (priv1 and priv2) visible to one person at the same time.

Recovering the Private Key

(14) The owner of the metal bar 100 can verify that the secrets (priv1 and priv2) of the bar 100 have not been revealed by verifying the integrity of the tamper-evident holographic stickers (hol1 and hol2).

(15) When the owner wishes to recover the private key priv0 corresponding to the public key pub0 engraved on their bar 100, they must remove the two tamper-evident holographic stickers (hol1 and hol2). The secrets (priv1 and priv2) are then visible.

(16) The software for recovering private keys asks the owner of the bar 100 to enter the secrets (priv1 and priv2) inscribed onto the metal bar 100. The software then generates the private key priv0 corresponding to the public key pub0. It was only at the recovery stage that the private key priv0 was calculated. It has never been present on any computer before, which means that neither the employees of the entity 31 nor the employees of the entity 32 could have seen this private key priv0.

SECOND EMBODIMENT

Figure 2:
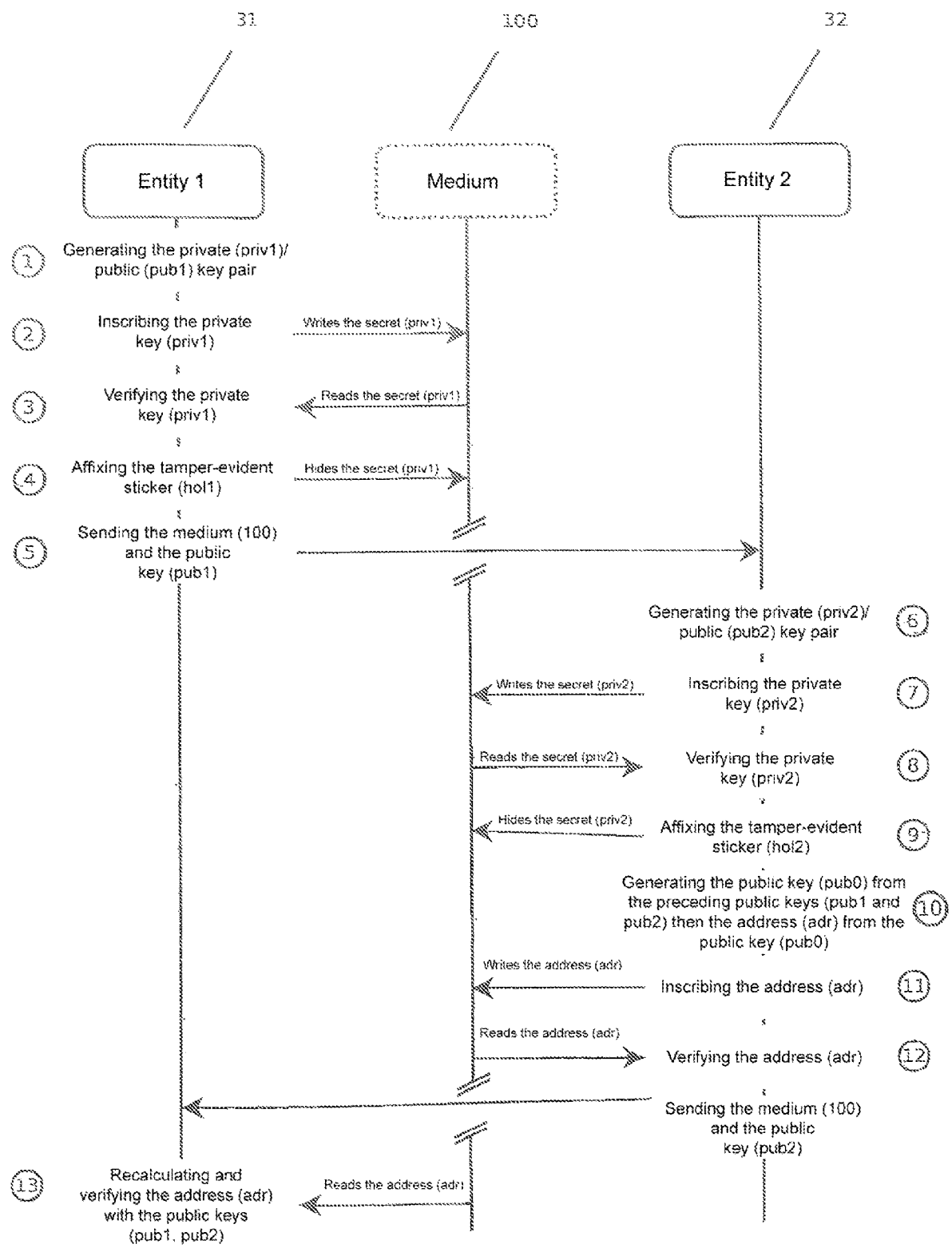
FIG. 2 shows a diagram of another representative embodiment of the invention using two management entities to provide a last user public key (pub0) and a cryptographic address.

FIG. 2 shows a representative embodiment of the invention using two management entities 31 and 32 to provide a last user public key (pub0) and a cryptographic address (adr).

In this variant, a last user public key (pub0) is generated and a cryptographic address (adr) is engraved (11) on the physical medium. The last user public key (pub0) is used to generate the cryptographic address (adr), this address (adr) being calculated from the last user public key (pub0) and being engraved on the physical medium.

In this variant of the method, the steps for generating and inscribing the public and private keys presented in the diagram of FIG. 2 are similar to those presented in the diagram of FIG. 1.

If the cryptographic keys are used in the context of cryptocurrencies, it is possible to inscribe the address (adr) corresponding to the public key (pub0) rather than the public key (pub0) itself.

In this variant, the steps (11) and (12) of the method are different. This time, instead of writing the public key pub0, Brian inscribes the address (adr) corresponding to the public key pub0. The calculation of the address (adr) depends on the cryptocurrency used but the address (adr) always depends on the public key pub0.

The verification carried out by the 1st entity 31 in step (13) is modified, because it is no longer the public key pub0 that is inscribed but rather the cryptocurrency address (adr). Consequently, the verification carried out consists in recalculating this address (adr) and verifying that the inscribed address (adr) matches the calculated address.

The verification carried out in (16) by the owner is also different because in this case, the owner of the physical medium 100 verifies the address pub0 and not the public key pub0.

THIRD EMBODIMENT

Figure 3:
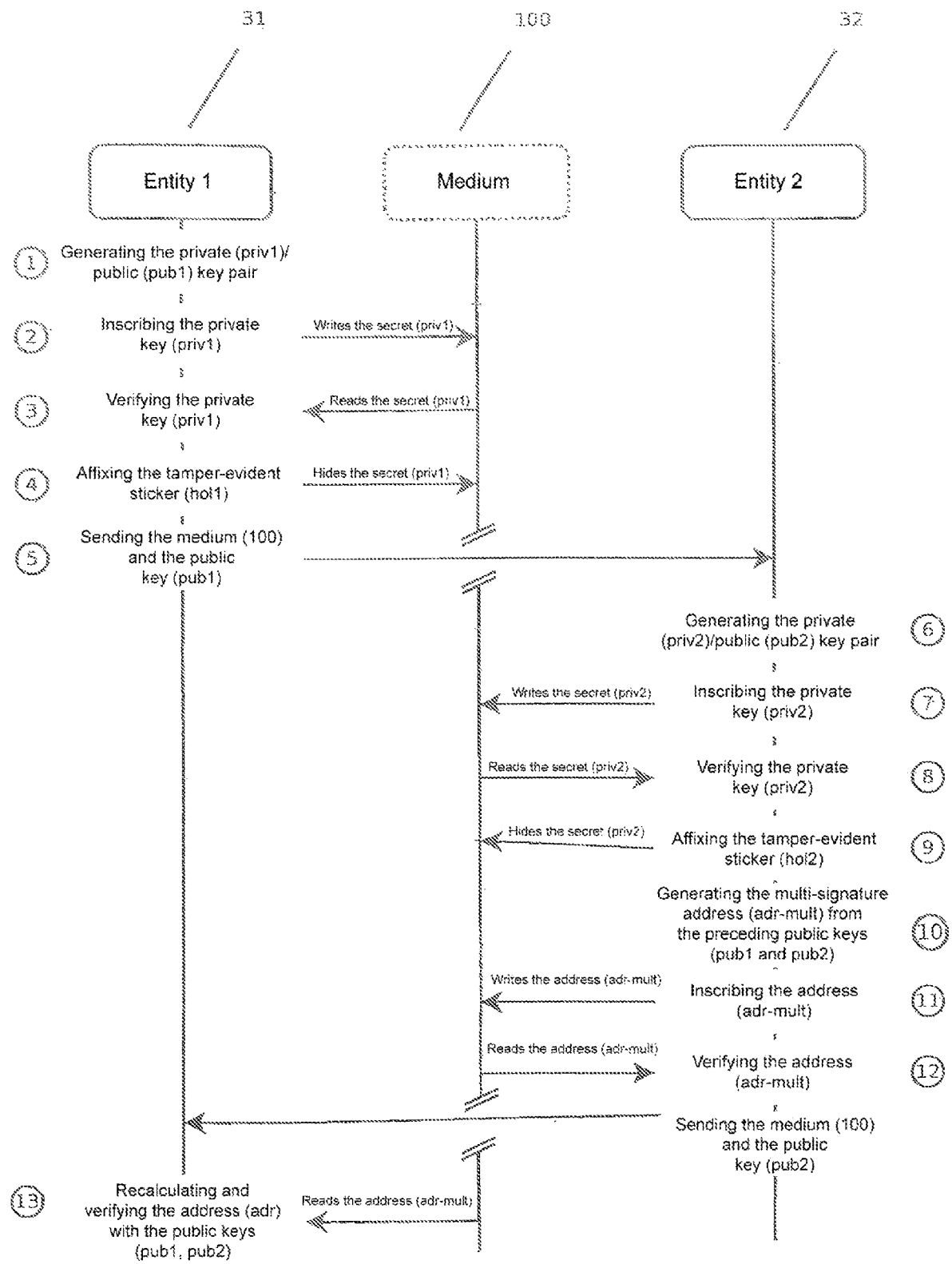
FIG. 3 shows a diagram of another representative embodiment of the invention using two management entities to provide a multi-signature address.

FIG. 3 shows a representative embodiment of the invention using two management entities 31 and 32 to provide a multi-signature address (adr-mult).

In this variant, a multi-signature address (adr-mult) is generated from the first user public key (pub1) and the second user public key (pub2), this multi-signature address (adr-mult) being engraved (11) on the physical medium.

In this variant of the method, the steps for generating and inscribing the public and private keys presented in the diagram of FIG. 3 are similar to those presented in the diagram of FIG. 2.

Remaining on the subject of cryptocurrencies, it is possible to make the address (adr-mult) depend directly on the public keys pub1 and pub2 without having to generate a third public key pub0. In this case the address (adr-mult)

inscribed onto the physical medium is a 2-of-2 "multi-signature" address, which means that to sign a transaction, the two private keys priv1 and priv2 inscribed under the hidden portions are used directly to sign a transaction. There is no generation of a 3rd private key, derived from the private keys priv1 and priv2.

The different steps of this preferred embodiment are, as for the variant of FIG. 2, steps (11), (12), (13) and (16). Steps (11) and (12) are different because it is not the public key pub0 that is inscribed onto the medium, but the multi-signature address (adr-mult) corresponding to the two public keys pub1 and pub2. In step (11), Brian inscribes the address (adr-mult) corresponding to the public keys pub1 and pub2. And in step (12) Bob verifies this address (adr-mult).

The verification carried out by the 1st entity 31 in step (13) is modified, because it is no longer the public key pub0 that needs to be verified, but rather the multi-signature cryptocurrency address (adr-mult). Consequently, as with the variant of FIG. 2, the verification carried out consists in recalculating the address (adr-mult) and verifying that the inscribed address (adr-mult) matches the calculated address.

The verification carried out in (16) is different because in this case, the owner of the physical medium 100 does not verify the public key pub0 but rather the multi-signature address (adr-mult) corresponding to the public keys pub1 and pub2.

FOURTH EMBODIMENT

Figure 4:
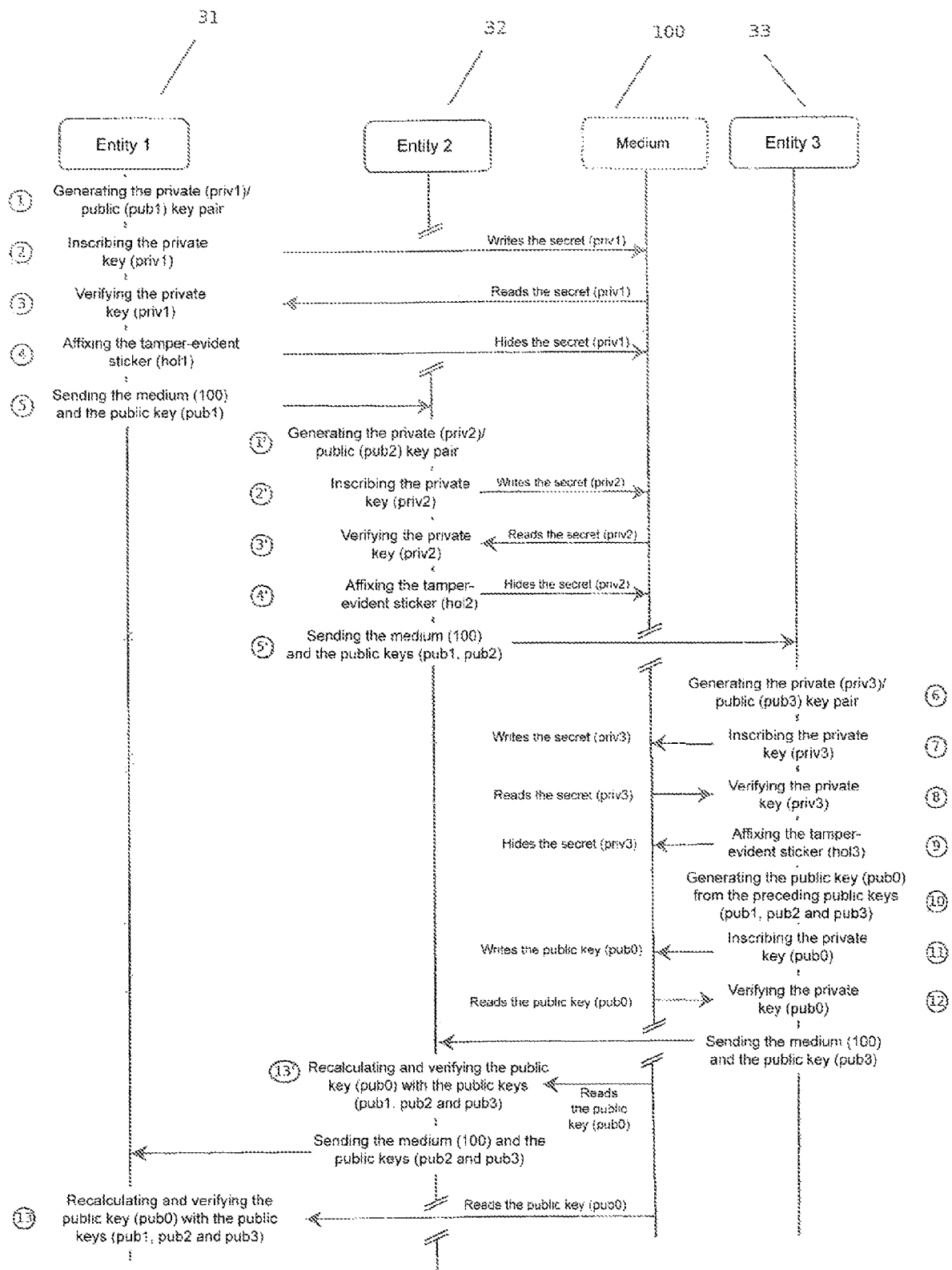
FIG. 4 shows a diagram of another representative embodiment of the invention using three management entities to provide a last user public key (pub0)

FIG. 4 shows a representative embodiment of the invention using three management entities 31, 32 and 33 to provide a last user public key (pub0).

In this variant, the system further comprises:

a third management entity (33) configured to generate a third pair of asymmetric cryptographic keys comprising a third user public key (pub3) and a third user private key (priv3), the third management entity (33) comprising:

a third computer (43) in which program instructions are stored, which instructions, when read by a third data processor, cause the third computer (43) to store the third user public key (pub3) in a third recording memory and to generate the third first user private key (priv3), a third device (53) associated with the third computer (43) configured to inscribe the third user private key (priv3) onto the physical medium, and a third means for verifying the third user private key (priv3) inscribed and affixing a third tamper-evident concealing element (hol3) to the physical medium in order to conceal the third user private key (priv3) and make it non-visible, the third computer (43) being further configured to generate the last user public key (pub0) from the first user public key (pub1), the second user public key (pub2) and the third user public key (pub3), and to allow the inscription of the last user public key (pub0) onto the physical medium by the third device (53).

As shown in FIG. 7, the entities 31, 32 and 33 each need an engraving machine 51, 52, 53 connected to a computer 41, 42, 43 in order to inscribe onto the metal bar. This computer 41, 42, 43 is not connected to any network, to avoid cyberattacks. Entities 31, 32 and 33 can use the same type of hardware 41, 42, 43, 51, 52, 53 and software.

Each entity 31, 32 and 33 has different holograms which it will affix to the metal bar. If there are three entities, there may be six employees involved, as an example:

Alice and Albert, employees of the first entity 31.
Charlie and Clara, employees of the second entity 32.
Bob and Brian, employees of the third entity 33.

Inscribing the Cryptographic Keys

The steps of generating and inscribing the public and private keys are shown in the diagram of FIG. 4.

(1) Alice generates a public/private key pair on the computer using the software.

(2) Alice takes a metal bar 100 and inscribes the private key (priv1).

(3) Albert enters this private key into the software. The latter re-generates the public key (pub1). Albert verifies that the public key generated from the private key and the public key (pub1) generated by Alice are the same.

(4) Once this verification has been carried out, Alice and Albert affix the tamper-evident holographic sticker (hol1) of their entity 31 over the private key (priv1).

(5) Alice and Albert send the metal bar and the public key (pub1) to the second entity 32.

The second entity 32 then performs a similar process.

(1') Charlie generates a public/private key pair, (2') Charlie inscribes the private key (priv2), then (3') Clara verifies with the software that the engraved key has the same public key (pub2) as that of Brian.

(4') Charlie and Clara affix the tamper-evident holographic sticker (hol2) of their entity 32 over the private key (priv2).

(5') Then Charlie and Clara send the metal bar and the public keys (pub1 and pub2) to the third entity 33.

The third entity 33 then performs a similar process.

(6) Brian generates a public/private key pair (priv3, pub3), (7) Brian inscribes the private key (priv3), then (8) Bob verifies with the software that the engraved key has the same public key (pub3) as that of Brian.

(9) Bob and Brian affix the tamper-evident holographic sticker (hol3) of their entity 33 over the private key (priv3).

(10) Then using the three public keys pub1, pub2 and pub3, Brian uses the software to derive a fourth public key (pub0).

(11) Brian inscribes this public key (pub0) onto the metal bar 100.

(12) In the last step Bob verifies, using the public keys pub1, pub2 and pub3, that the public key pub0 has been correctly engraved on the metal bar 100. For this, he enters, in turn, the public keys pub1, pub2 and pub3 into the software and makes sure that the public key pub0 engraved on the metal bar 100 is the correct one. Bob and Brian send the metal bar and public key (pub3) to the second entity.

(13') Employees Charlie and Clara of the entity 32 must calculate the public key (pub0) using the public keys pub1, pub2 and pub3 and verify that the public key (pub0) inscribed onto the metal bar 100 is the same as the one they calculated. Charlie and Clara send the metal bar and the public keys (pub2 and pub3) to the first entity.

(13) Employees Alice and Albert of the entity 31 must also calculate the public key (pub0) using the public keys pub1, pub2 and pub3 and verify that the public key (pub0) inscribed onto the metal bar 100 is the same as the one they calculated.

Then, once the engraving process has been completed correctly, the employees of the entity 31 seal the metal bar 100 in plastic protection.

This process creates a metal bar 100 on which three private keys (priv1, priv2 and priv3) are inscribed by three different entities, hidden by three tamper-evident holographic stickers (hol1, hol2 and hol3), as well as a public key (pub0) corresponding to the combination of the three hidden private keys (priv1, priv2 and priv3). At no time were the three private keys (priv1, priv2 and priv3) visible to one person at the same time.

Recovering the Private Key

(14) The owner of the metal bar 100 can verify that the secrets (priv1, priv2 and priv3) of the bar 100 have not been revealed by verifying the integrity of the tamper-evident holographic stickers (hol1, hol2 and hol3).

(15) When the owner wishes to recover the private key priv0 corresponding to the public key pub0 engraved on their bar 100, they must remove the three tamper-evident holographic stickers (hol1, hol2 and hol3). The secrets (priv1, priv2 and priv3) are then visible.

(16) The software for recovering private keys asks the owner of the bar 100 to enter the secrets (priv1, priv2 and priv3) inscribed onto the metal bar 100. The software then generates the private key priv0 corresponding to the public key pub0. It was only at the recovery stage that the private key priv0 was calculated. It has never been present on any computer before, which means that neither the employees of the entity 31 nor the employees of the entities 32 or 33 could have seen this private key priv0.

FIFTH EMBODIMENT

Figure 5:
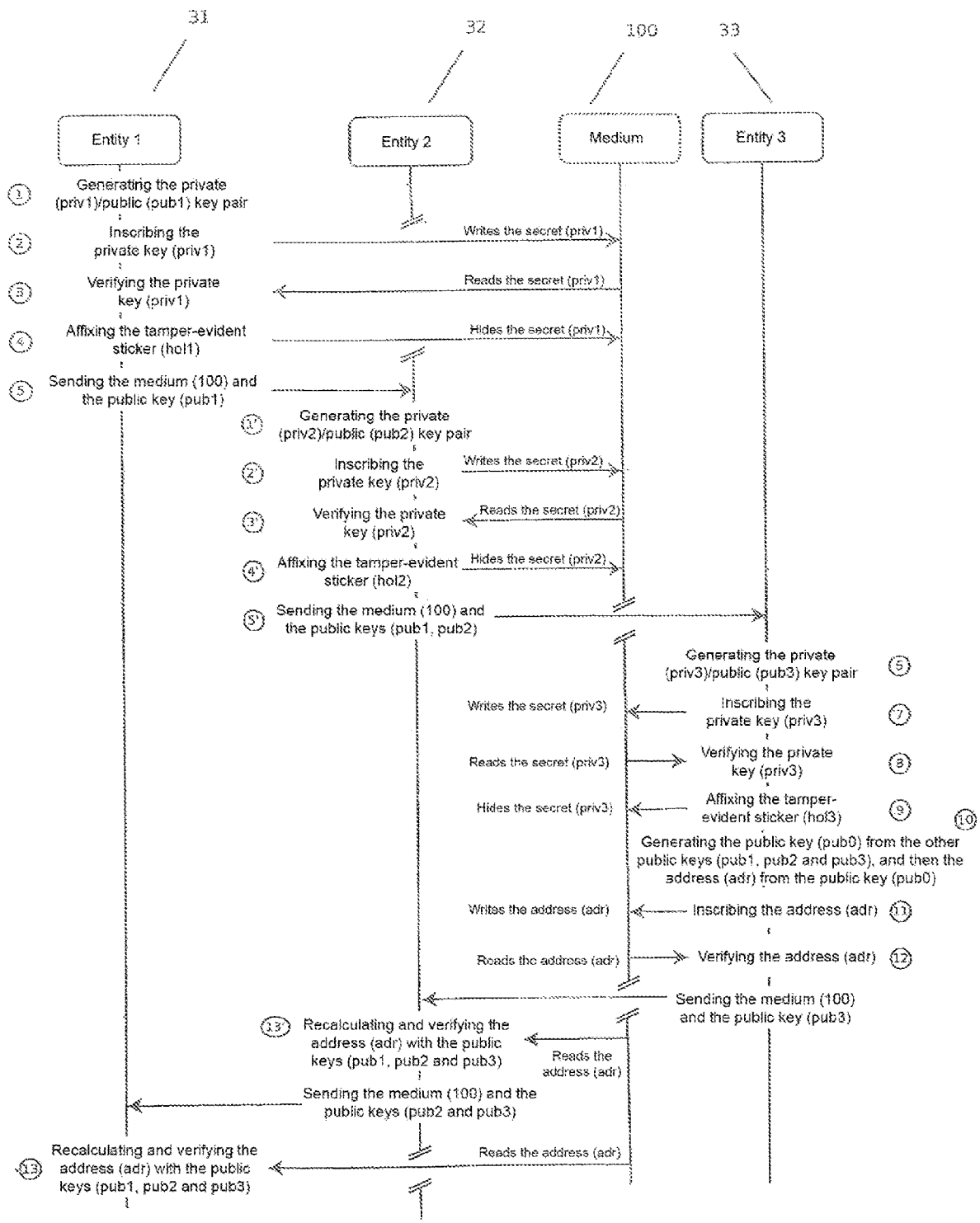
FIG. 5 shows a diagram of another representative embodiment of the invention using three management entities to provide a last user public key (pub0) and a cryptographic address.

FIG. 5 shows a representative embodiment of the invention using two management entities 31, 32 and 33 to provide a last user public key (pub0) and a cryptographic address (adr).

In this variant, a last user public key (pub0) is generated and a cryptographic address (adr) is engraved (11) on the physical medium. The last user public key (pub0) is used to generate the cryptographic address (adr), this address (adr) being calculated from the last user public key (pub0) and being engraved on the physical medium.

In this variant of the method, the steps for generating and inscribing the public and private keys presented in the diagram of FIG. 5 are similar to those presented in the diagram of FIG. 4.

If the cryptographic keys are used in the context of cryptocurrencies, it is possible to inscribe the address (adr) corresponding to the public key (pub0) rather than the public key (pub0) itself.

In this variant, the steps (11) and (12) of the method are different. This time, instead of writing the public key pub0, Brian inscribes the address (adr) corresponding to the public key pub0. The calculation of the address (adr) depends on the cryptocurrency used but the address (adr) always depends on the public key pub0.

The verification carried out by the first and second entities 31 and 32 in step (13' and 13) is modified, because it is no longer the public key pub0 that is inscribed, but rather the cryptocurrency address (adr). Consequently, the verification carried out consists in recalculating this address (adr) and verifying that the inscribed address (adr) matches the calculated address.

The verification carried out in (16) by the owner is also different because in this case, the owner of the physical medium 100 verifies the address (adr) and not the public key pub0.

SIXTH EMBODIMENT

Figure 6:
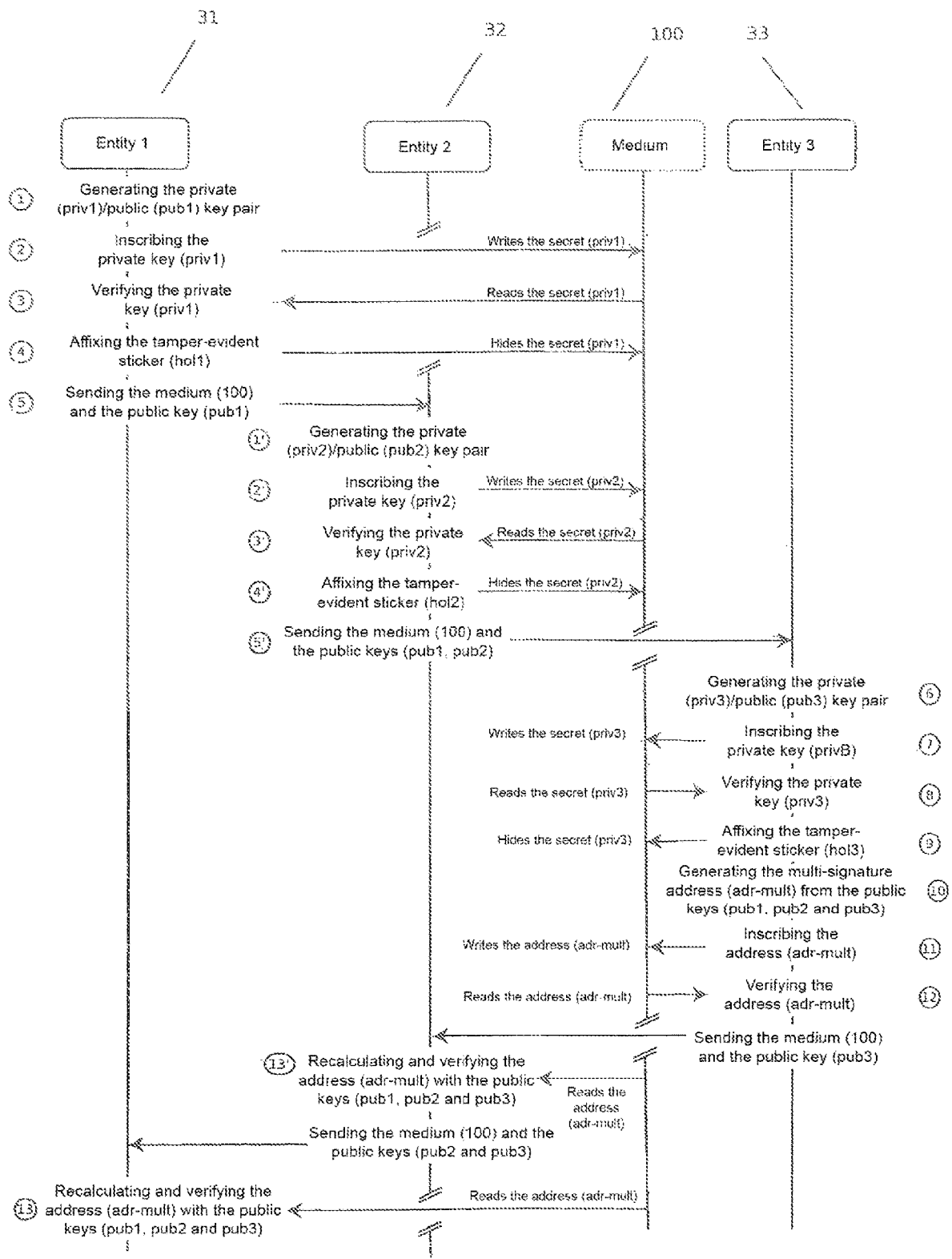
FIG. 6 shows a diagram of another representative embodiment of the invention using three management entities to provide a multi-signature address.

FIG. 6 shows a representative embodiment of the invention using three management entities 31, 32 and 33 to provide a multi-signature address (adr-mult).

In this variant, a multi-signature address (adr-mult) is generated from the first user public key (pub1), the second user public key (pub2) and the third user public key (pub3), this multi-signature address (adr-mult) being engraved (11) on the physical medium.

In this variant of the method, the steps for generating and inscribing the public and private keys presented in the diagram of FIG. 6 are similar to those presented in the diagram of FIG. 5.

Remaining on the subject of cryptocurrencies, it is possible to make the address (adr-mult) depend directly on the public keys pub1, pub2 and pub3 without having to generate a fourth public key pub0. In this case the address (adr-mult) inscribed onto the physical medium is a 3-of-3 "multi-signature" address, which means that to sign a transaction, the three private keys priv1, priv2 and priv3 inscribed under the hidden portions are used directly to sign a transaction. There is no generation of a 4th private key, derived from the private keys priv1, priv2 and priv3.

The different steps of this preferred embodiment are, as for the variant of FIG. 5, steps (11), (12), (13) and (16). Steps (11) and (12) are different because it is not the public key pub0 that is inscribed onto the medium, but rather the multi-signature address (adr-mult) corresponding to the three public keys pub1, pub2 and pub3. In step (11), Brian inscribes the address (adr-mult) corresponding to the public keys pub1, pub2 and pub3. And in step (12) Bob verifies this address (adr-mult).

The verification carried out by the first and second entities 31 and 32 in step (13', 13) is modified, because it is no longer the public key pub0 that needs to be verified, but rather the multi-signature cryptocurrency address (adr-mult). Consequently, as with the variant of FIG. 5, the verification carried out consists in recalculating the address (adr-mult) and verifying that the inscribed address (adr-mult) matches the calculated address.

The verification carried out in (16) is different because in this case, the owner of the physical medium 100 does not verify the public key pub0 but rather the multi-signature address (adr-mult) corresponding to the public keys pub1, pub2 and pub3.

OTHER EMBODIMENTS WITH MULTIPLE SECRETS

The number of secrets of the preferred embodiment involves two or three entities, each with a signature. However, the number of entities involved in the execution may be greater. This number is only limited by the space available on the physical medium.

In this case the process is very similar. If n entities are involved in the execution, the n−1 first entities perform steps (1) to (5) one after the other and the last entity completes the execution with steps (6) to (12).

The step (13) of verifying the public key or the address inscribed onto the physical medium must be carried out by all the entities which have generated a private key.

In this variant, the step of verification by the owner is also different, because this time it requires the combination of n private keys.

The n secrets can be used to generate:
1 A public key (as in the embodiment of FIG. 1),
2. The address of a public key (as in the variant of FIG. 2),
3. The multi-signature address of multiple public keys (as in the variant of FIG. 3).

Physical Medium

Figure 8:
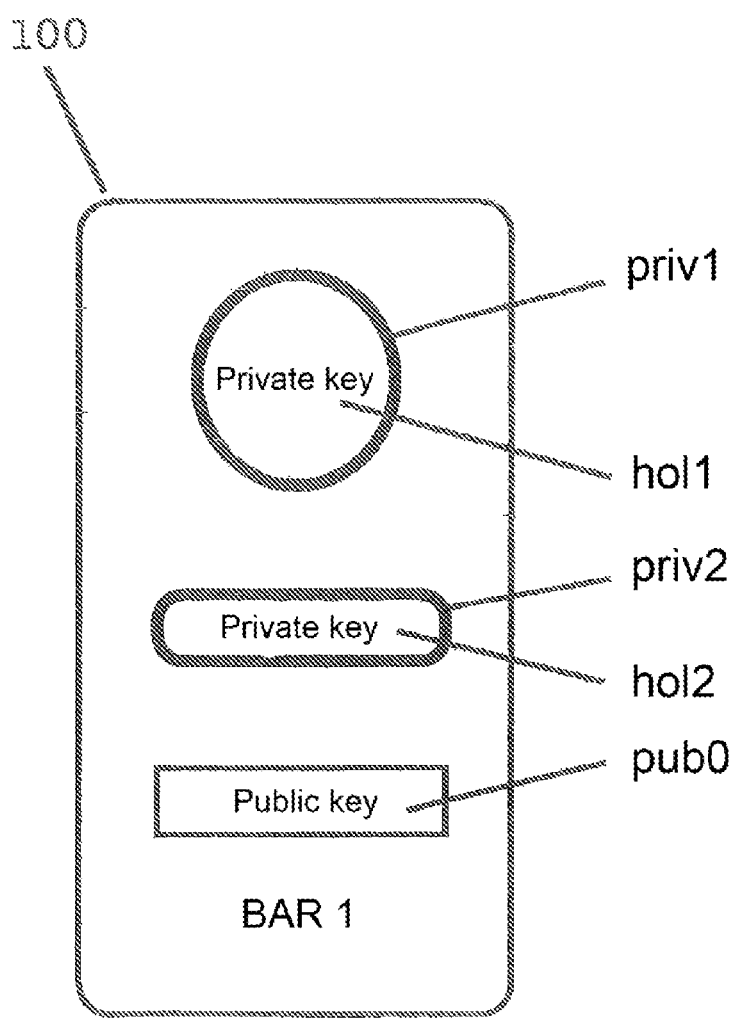
FIG. 8 is a schematic view of a physical medium in one embodiment of the invention.

FIG. 8 is a schematic view of a physical medium 100 in one embodiment of the invention, This physical medium 100 comprises:
- a first user private key (priv1) inscribed onto the medium, the first user private key (priv1) being associated with a first user public key (pub1) to form a first pair of asymmetric cryptographic keys,
- a first tamper-evident concealing element (hol1) for concealing first user private key (priv1) and sealing same, said first user private key (priv1) being accessible only by visibly breaking said first tamper-evident concealing element (hol1),
- a second user private key (priv2) inscribed onto the medium, the second user private key (priv2) being associated with a second user public key (pub2) to form a second pair of asymmetric cryptographic keys,
- a second tamper-evident concealing element (hol2) for concealing second user private key (priv2) and sealing same, the second user private key (priv2) being accessible only by visibly breaking the second tamper-evident concealing element (hol2); and
- a last user public key (pub0) inscribed onto the medium, which is generated from the first user public key (pub1) and the second user public key (pub2).

Instead of the last user public key (pub0), a cryptographic address can also be inscribed onto the medium.

The medium 100 can be formed from a bar of metal or metal alloy, such as a gold, platinum, silver or steel bar. Any other medium can be used to inscribe the private keys. For example, wood, glass, stone, plastic, ceramics, paper, etc.

The inscription can use alphanumeric characters, barcodes, QR codes or any other possible representation.

Instead of inscribing the codes directly onto a metal bar, it is possible to inscribe the different codes (public keys, private keys or addresses) onto one or more moving metal part(s).

Other variants of the process are possible and are described in the following section.

Multiple Media

Figure 9:
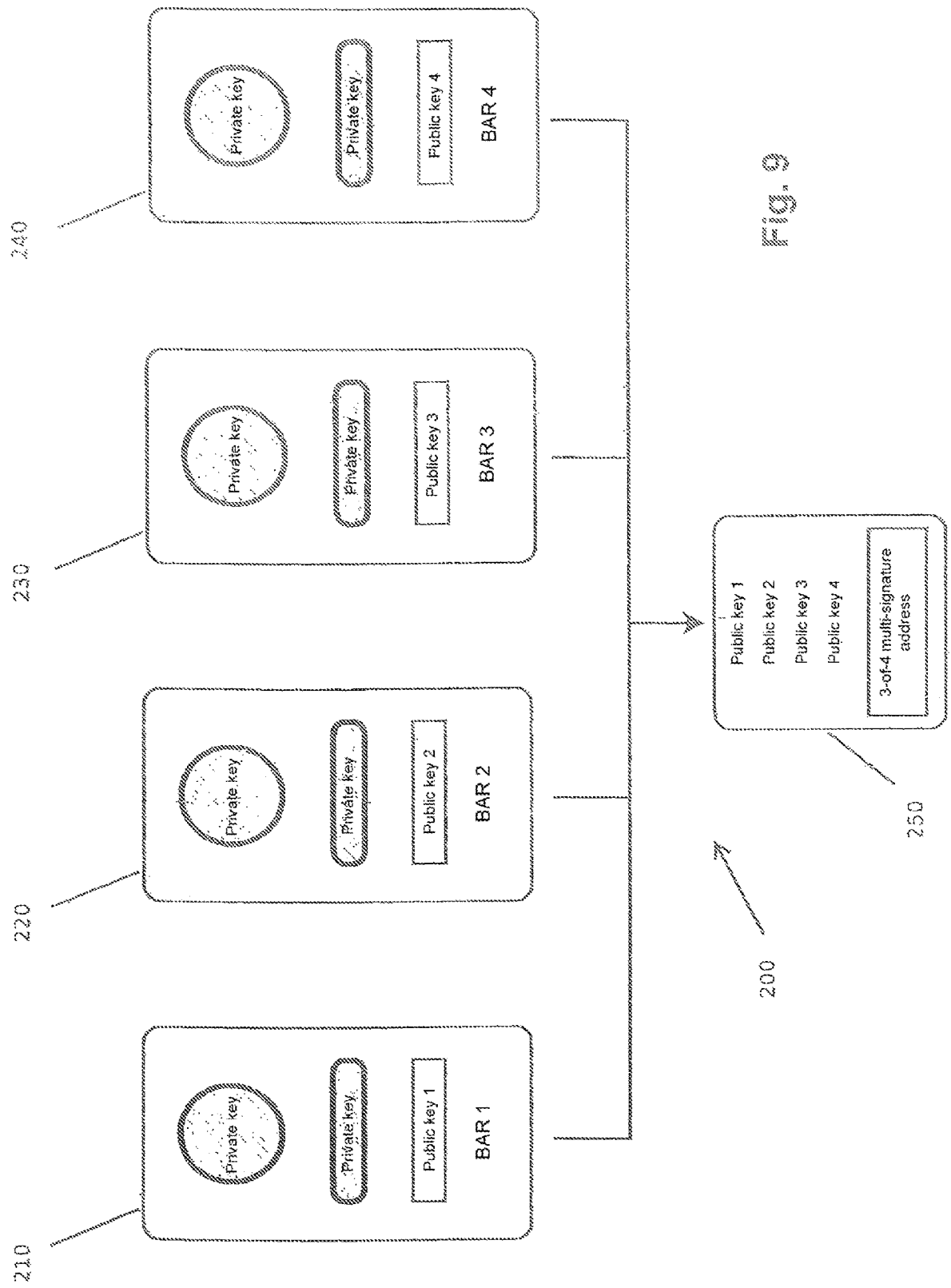
FIG. 9 is a schematic view of a physical medium in another embodiment of the invention, The present invention is described with particular embodiments and references to figures, but the invention is not limited by these. The described drawings or figures are only schematic and are not limiting.

FIG. 9 is a schematic view of a physical medium 200 in another embodiment of the invention.

This alternative embodiment is an extension of the preferred embodiment described in FIG. 1 to 6 (or the variant with multiple secrets for a public key). It uses the preceding methods to create a plurality of physical media 210, 220, 230, 240.

The medium 200 is formed by a plurality of separate elements 210, 220, 230, 240 and a base 250, each separate element 210, 220, 230, 240 has its own private keys (priv1, priv2) and its own public key (pub1), a multi-signature cryptocurrency address common to the separate elements 210, 220, 230, 240 being generated and inscribed onto the base 250.

Since each medium 210, 220, 230, 240 has its own public key, it is possible to generate a multi-signature cryptocurrency address common to a plurality of physical media. For example, if three elements of physical media are used, it is possible to generate a multi-signature address (2-of-3) corresponding to the three public keys. This address can therefore now be inscribed onto a 4th element or base of the physical medium.

In this case, the process is as follows: (1) n elements of physical media are created by the two or three entities in accordance with the preferred embodiment described in FIG. 1 (or variant with multiple secrets).

(2) Alice of the entity 31 enters the n public keys and indicates the required number of signatures s into the software that generates the multi-signature cryptocurrency address.

Alice inscribes this address onto a physical medium.

(3) Albert enters the public keys and the required number of signatures into the software that generates the address. Albert verifies that the address is the same as that inscribed by Alice onto the physical medium.

(4) The second entity verifies that the address inscribed onto the physical medium matches the public keys inscribed onto the n physical media as well as the number s of signatures required.

The phase of recovering cryptocurrency tokens deposited at the multi-signature address requires the same steps of the preferred embodiment presented in detail above in FIG. 1.

In the case of an s-of-n multi-signature address, these steps must be carried out by s owners of physical media whose public keys were used to generate the multi-signature address.

That is to say if there are three physical media and the multi-signature address requires two out of three signatures, steps (13), (14) and (15) must be carried out by two of the owners of the physical media. An additional step (16) is added, after the private keys have been recovered. The two owners of the physical media must generate a transaction (knowing the three public keys) and each of them must sign this transaction in order to transfer the cryptocurrency tokens.

The present invention is in no way limited to the embodiments described by way of example and shown in the figures. Many modifications of details, shapes and dimensions can be made without departing from the scope of the invention. The present invention has been described in relation to specific embodiments, which have a purely illustrative value and should not be considered as limiting. For example, other uses of the method, system and physical medium of the invention are possible in industries such as automotive, luxury, shipping, real estate, legal, IP (Internet Protocol), etc. The reference numbers in the claims do not limit their scope.

The invention claimed is:

1. A computer-implemented method comprising:
    generating public-private data for storing on a physical medium, wherein the public-private data comprise a first private data of a first public-private data pair and a first public data of the first public-private data pair, wherein the first private data is stored on the physical medium at a first entity in a manner that any access by any entity, other than the first entity, to the first private data on the physical medium is evident or detectable, the generating of the public-private data comprising:
    generating a second public-private data pair associated with a second public data and a second private data;
    wherein the second private data of the second public-private data pair is stored on the physical medium at a second entity in a manner that any access by any entity, other than the second entity, to the second private data on the physical medium is evident or detectable;
    generating particular public data using, at least in part, the first public data of the first public-private data pair and the second public data of the second public-private data pair;
    wherein the particular public data is stored on the physical medium in a manner that the particular public data is publicly retrievable.

2. The method of claim 1 further comprising:
recovering a particular private data that is uniquely associated with the particular public data of the physical medium by receiving the first private data and the second private data retrieved from the physical medium, and generating the particular private data.

3. The method of claim 2, wherein a particular public key corresponding to the public data and a particular private key of the particular private data are part of a same particular public-private data pair.

4. The method of claim 1, wherein the physical medium comprises:
a first tamper evident seal concealing an inscription of the first private data, wherein any access to the first private data causes a break in the first tamper evident seal;
wherein the first tamper evident seal concealing the inscription of the first private data is attached at the first entity;
a second tamper evident seal concealing an inscription of the second private data, wherein any access to the second private data causes a break in the second tamper evident seal;
wherein the second tamper evident seal concealing the inscription of the second private data is attached at the second entity.

5. The method of claim 1 wherein the public data comprises one or more of: a particular public key of a particular public-private data pair having a particular private key, a multi-signature address, or a cryptographic address.

6. The method of claim 1, wherein the public data comprises a cryptographic address associated with a particular public key and wherein generating the public data using, at least in part, the first public data and the second public data comprises:
generating the particular public key using, at least in part, a first public key of the first public-private data pair and a second public key of the second public-private data pair;
generating the cryptographic address using, at least in part, the particular public key.

7. The method of claim 1, further comprising causing inscription of the second private data on the physical medium and thereby causing storing of the second private data on the physical medium.

8. The method of claim 1, further comprising:
reading, from the physical medium, private data stored by the second entity as a retrieved private data;
verifying that the retrieved private data and the second public data are associated with the same second public-private data pair.

9. The method of claim 1, wherein the first public-private data pair comprises a first private key and a first public key, and wherein the second public-private data pair comprises a second private key and a second public key.

10. The method of claim 1, wherein the first entity is different from the second entity.

11. A physical medium comprising:
a first private data of a first public-private data pair associated with a first public data;
a second private data of a second public-private data pair associated with a second public data;
wherein any access to the first private data or the second private data on the physical medium is evident or detectable;
particular public data that is based, at least in part, on the first public data of the first public-private data pair and the second public data of the second public-private data pair;
wherein the particular public data is publicly retrievable from the physical medium.

12. The physical medium of claim 11 wherein the particular public data is uniquely associated with a particular private key which is based, at least in part, on a first private key of the first public-private data pair and a second private key of the second public-private data pair.

13. The physical medium of claim 12, wherein a particular public key corresponding to the particular public data and the particular private key are associated with a same particular public-private data pair.

14. The physical medium of claim 11, further comprising:
a first tamper evident seal concealing an inscription of the first private data, wherein any access to the first private data causes a break in the first tamper evident seal;
wherein the first tamper evident seal concealing the inscription of the first private data is attached at a first entity;
a second tamper evident seal concealing an inscription of the second private data, wherein any access to the second private data causes a break in the second tamper evident seal;
wherein the second tamper evident seal concealing the inscription of the second private data is attached at a second entity.

15. The physical medium of claim 11 wherein the particular public data comprises one or more of: a particular public key of a particular public-private data pair having a corresponding particular private key, a multi-signature address or a cryptographic address uniquely associated with a particular private key.

16. The physical medium of claim 11:
wherein the particular public data indicates a cryptographic address and is based, at least in part on, a particular public key of a particular public-private data pair having a particular private key,
wherein the particular public key is based, at least in part, on a first public key of the first public-private data pair and a second public key of the second public-private data pair,
wherein the particular private key is based, at least in part, on a first private key of the first public-private data pair and a second private key of the second public-private data pair.

17. The physical medium of claim 11, wherein the particular public data is a publicly visible inscription on the physical medium.

* * * * *